(12) United States Patent
Owen

(10) Patent No.: US 9,466,274 B1
(45) Date of Patent: Oct. 11, 2016

(54) MUSICAL INSTRUMENT

(71) Applicant: Sharon Lee Butcher, Riverside, CA (US)

(72) Inventor: Gary Randall Owen, Lake Elsinore, CA (US)

(73) Assignee: Sharon Lee Butcher, Riverside, CA (US)

( * ) Notice: Subject to any disclaimer, the term of this patent is extended or adjusted under 35 U.S.C. 154(b) by 0 days.

(21) Appl. No.: 14/644,394

(22) Filed: Mar. 11, 2015

Related U.S. Application Data

(60) Provisional application No. 61/952,502, filed on Mar. 13, 2014.

(51) Int. Cl.
*G10D 15/00* (2006.01)
*B23D 57/02* (2006.01)

(52) U.S. Cl.
CPC ............... *G10D 15/00* (2013.01); *B23D 57/02* (2013.01)

(58) Field of Classification Search
CPC .......... G10D 1/08; G10D 1/085; G10D 3/00; G10D 17/00; Y10T 156/10; G10G 5/005; G10G 7/00

USPC .................................. 84/267, 290, 291, 329
See application file for complete search history.

(56) References Cited

U.S. PATENT DOCUMENTS 2,510,957 A * 6/1950 Carter .................... G10D 17/00
84/322

OTHER PUBLICATIONS http://www.zimbio.com/pictures/9ybZ9kwpOyE/Avril+Lavigne+Films+Music+Video/ULUulxJk-XE, Lavigne Jul. 26, 2013.*
http://fr.audiofanzine.com/autre-guitare-electrique-solid-b/forums/t.123640,gratte-moche-land,p.2512.html, Pose Aug. 21, 2013.*

* cited by examiner

*Primary Examiner* — Kimberly Lockett
(74) *Attorney, Agent, or Firm* — R. Dabney Eastham

(57) ABSTRACT

A musical instrument comprises a traditional musical instrument such as a guitar is joined to a chain saw so that the saw blade of the chain saw is mounted next to the body of the guitar. The saw chain of the chain saw is spaced from the body of the guitar so that it can rotate freely without contacting the guitar. A shield prevents the operator from contact with the saw chain.

19 Claims, 4 Drawing Sheets

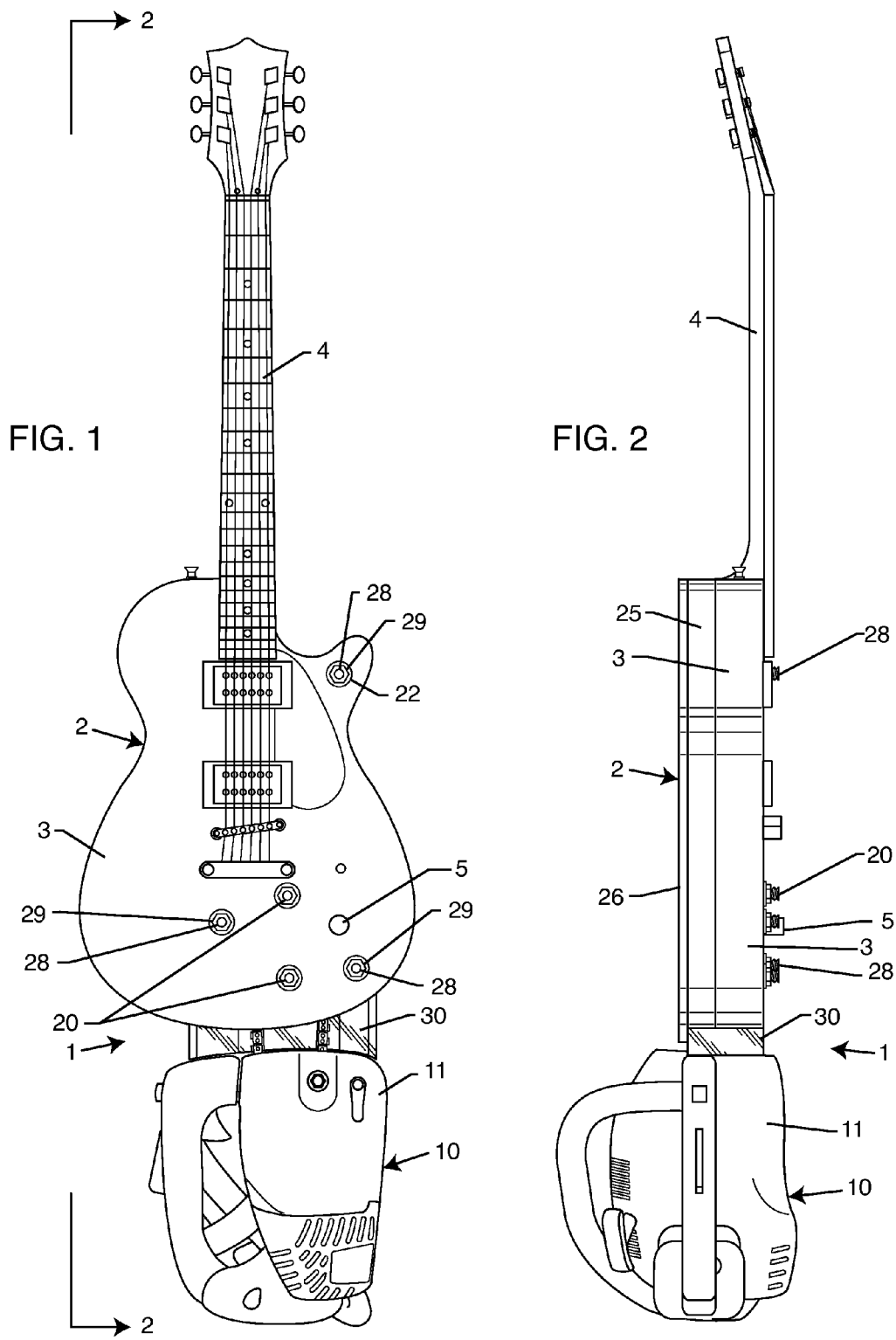

ered saw 10.

MUSICAL INSTRUMENT

CROSS-REFERENCE TO RELATED APPLICATIONS

This non-provisional patent application claims benefit and priority under 35 U.S.C. §119(e) of U.S. provisional patent application Ser. No. 61/952,502, filed on Mar. 13, 2014, and titled "Musical Instrument," the contents of which are incorporated herein by reference for all purposes.

BACKGROUND OF THE INVENTION

Musicians, and particularly rock musicians, seek new and interesting sounds to surprise and delight their audiences. A need exists for musical instruments that are capable of providing these sounds.

SUMMARY OF THE INVENTION

A musical instrument is provided by combining a motorized saw, such as a chainsaw, with a more traditional musical instrument, such as an electric guitar. A motorized saw produces a characteristic sound composed of the sound of the engine of the saw and the sound of the moving or rotating saw blade or saw chain.

The musician may operate the saw while playing the musical instrument in order to combine the sound of the saw with the music produced on the traditional musical instrument. The combination of the saw and the traditional musical instrument also will provide an arresting image that will surprise and delight the audience. The moving blade of the saw is provided with one or more shields so that the musician is protected from contact with the moving blade or chain while operating the traditional musical instrument.

DESCRIPTION OF THE DRAWINGS

FIG. 1 is an elevational view of the top side of an exemplary embodiment of the musical instrument according to the invention;

FIG. 2 is an elevational view of the left side of the embodiment of the musical instrument shown in FIG. 1;

DETAILED DESCRIPTION OF THE PREFERRED EMBODIMENTS

Figure 3:
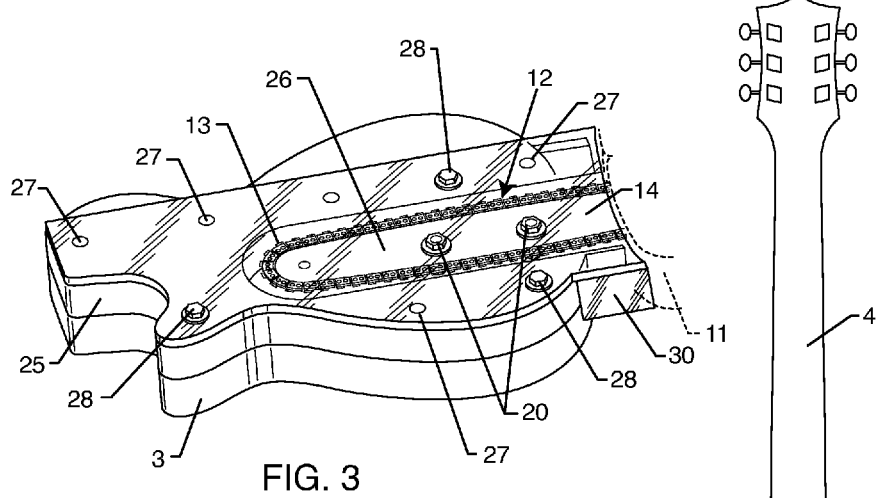
FIG. 3 is a perspective view of a portion of the musical instrument shown in FIG. 1, showing the junction of the guitar and chain saw components.
Figure 4:
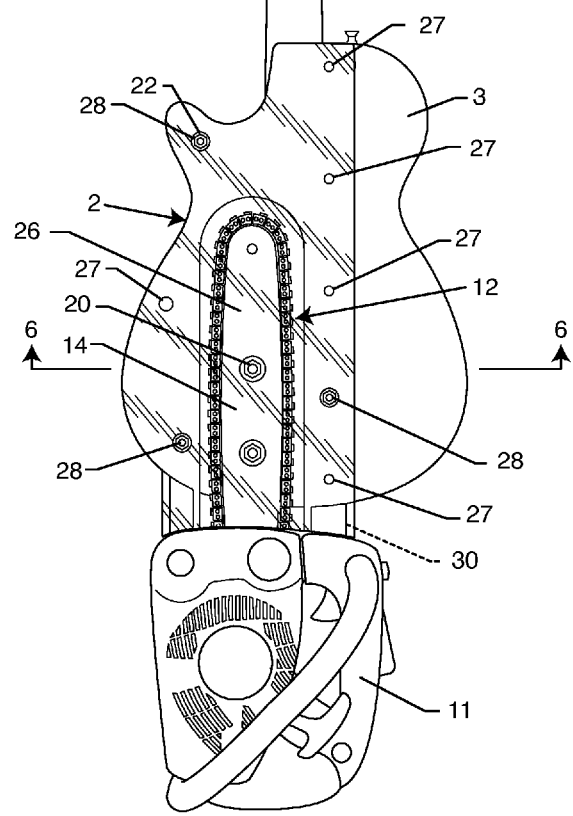
FIG. 4 is an elevational view of the rear of the embodiment of the musical instrument shown in FIG. 1.

A preferred embodiment of a musical instrument 1 according to the invention is shown in the drawings. It has two main components joined to each other: a traditional musical instrument in the form of a guitar 2, and a powered saw 10.

The guitar 2 shown in the drawings is an electric guitar with a body 3 joined to a neck 4. The guitar 2 has controls 5 mounted on the body 3. The components and general construction of an electric guitar are well known and will not be discussed further.

The powered saw 10 shown in the drawings is of the kind that has an internal combustion engine 11 powering a saw 12. The particular powered saw 10 shown in the drawings is an Echo® brand chain saw, although other brands of chain saws may be employed.

The saw 12 is of a conventional design with a saw chain 13 traveling around the edge of a saw blade 14 (see FIGS. 3-6). The engine 11 turns a gear with teeth (not shown) that engages the saw chain 13 and causes it to move around the edge of the saw blade 14. The components of a motorized chain saw are well known and will not be discussed further other than in connection with its connection to the guitar 2.

Figure 5:
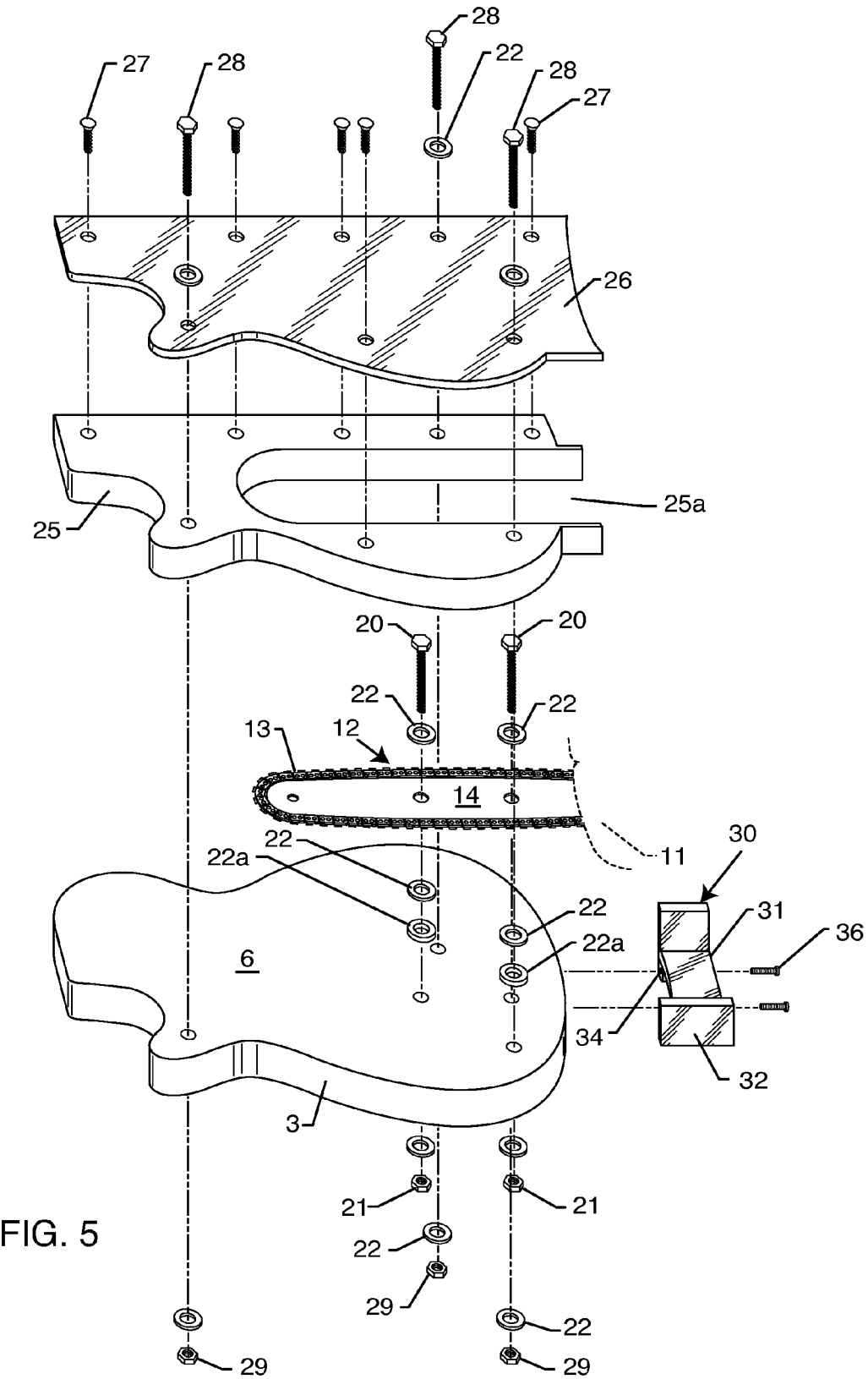
FIG. 5 is an exploded view of a portion of the embodiment of the musical instrument shown in FIG. 1, showing in particular the juncture of the chain saw and the electric guitar.
Figure 6:
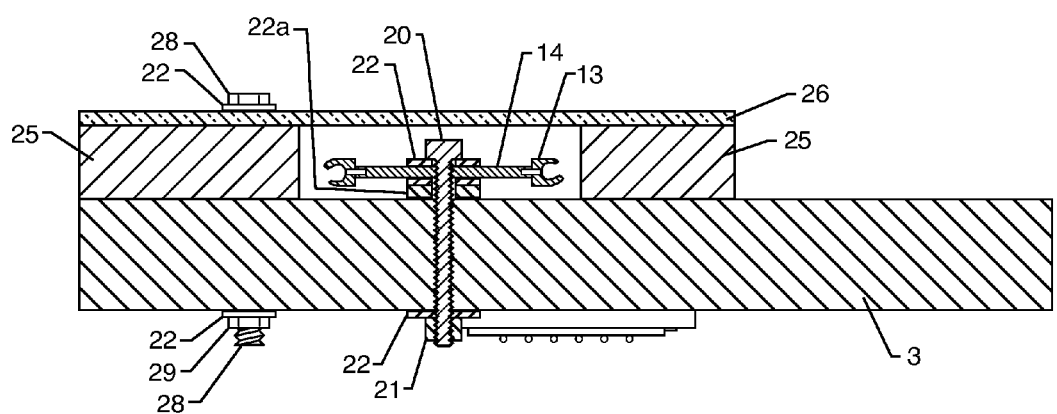
FIG. 6 is a cross-sectional view of the embodiment of the musical instrument shown in FIG. 1, taken through plane 6-6 in FIG. 4.

The saw 12 is connected to the guitar 2 by two bolts 20. The bolts 20 secure the saw blade 14 to the body 3 of the guitar 2. FIGS. 5 and 6 best show this connection. Each bolt 20 passes through a hole in the saw blade 14 and then through a hole drilled in the body 3 of the guitar 2. A nut 21 secures the bolt 20 in place. The spacers 22 and 22a are mounted on the bolt 20 between the saw blade 14 and the body 3 of the guitar. The spacers 22 and 22a together are sufficiently thick to separate the saw blade 14 from the backside 6 of the body 3 of the guitar 2 enough in order to prevent the saw chain 13 from contacting the backside 6 of the body 3. The saw chain 13 therefore will be able to move freely without contacting the body 3.

The saw chain 13 should be prevented from contacting the operator of the musical instrument 1 in order to prevent injury. The musical instrument 1 employs a collar 25, a back shield 26, and a front and intermediate shield 30 to prevent the saw chain 13 from contacting the operator, her hair, her clothing, or anything else. The combination of the body 3, the collar 25, the shield 26, and the shield 30 preferably should cover the portion of the saw 12 that is not covered within the housing of the engine 11.

The generally horseshoe-shaped collar 25 is attached to the backside 6 of the body 3 of the guitar 2. The collar 25 has a slot or opening 25a that accommodates the saw 12 and is open in the direction of the base of the saw 12 where it joins to the engine 11. The collar 25 has a depth or thickness sufficient to envelop the sides of the saw 12 without contacting the saw chain 13. The back shield 26 is attached to the collar 25 by screws 27. The shield 26 covers the backside of the saw 12. The collar 25 and the shield 26 effectively cover the saw 12 and will prevent the operator from contacting the saw chain 13.

The collar 25 may be made of wood or metal and may be attached to the body 3 of the guitar 2 by adhesive, screws, or the like. (The embodiment shown in FIG. 5 shows three bolts 28 and nuts 29, and six spacers or washers 22 being used to join the shield 26 and the collar 25 to the body 3 of the guitar 2). The shield 26 may be attached to the collar 25 by adhesive, bolts, screws, or other means. The embodiment of the invention shown in the drawings employs the screws 27 and the bolts 28, the nuts 29, and the spacers 22. The shield 26 preferably is transparent in order to permit the audience to see the saw 12 and watch the rotation of the saw chain 13. A sheet of transparent material such as glass or plastic such as polycarbonate (sold under trade marks such as Lexan® and Makrolon®) or poly(methyl methacrylate) (PMMA) (sold under trade marks such as Plexiglas®, Lucite®, and Perspex®) may be used for the shield 26.

The front and sides shield 30 fits between the body 3 of the guitar 2 and the engine 11 of the chain saw 10. Its purpose is the same as that of the shield 26, namely to prevent contact with the moving saw chain 13. It is preferably is made of the same material as that of the shield 26 or a similar material that is transparent to permit the saw 12 to be visible. The shield 30, however, may be made of other materials, such as wood or fiberglass, and need not be transparent.

The shield 30, best seen in the exploded view of FIG. 5, has a base 31 and end walls 32. The base 31 is fastened to the end walls 32 by adhesive, screws, or the like. The flanges 34 are connected to the base 31 by adhesive, screws or the like. The screws 36 fasten the flanges 34 to the body 3 of the guitar 2 and thus secure the shield 30 to the guitar 2.

The base 31 prevents objects on the front of the musical instrument 1 from coming into contact with the moving saw chain 13. The end walls 32 do the same for objects on the sides of the musical instrument 1.

The operator of the musical instrument 1 will hold it in manner similar to that of any guitar. A strap (not shown) may be used to suspend the musical instrument from the shoulder of the operator. The operator will start the engine 11 by pulling on its starting cord. Once started, the engine 11 can be kept in idle. The guitar 2 may be played in the usual way using one hand to strum and the other hand to press on the various strings of the guitar 2 between the frets in the vicinity of the neck 4. At selected times in the performance the operator may increase the speed of the engine 11 by using one hand to press or squeeze the throttle in the handle of the engine 11. This will gun or accelerate the engine 11 and make the engine 11 emit a much greater sound along with the sound of the saw chain 13 rotating around the saw blade 14 (normally the saw chain 13 does not rotate around the saw blade 14 when the engine 11 is idling).

The sounds of the engine 11 and the moving saw chain 13 will provide a vivid effect to the music from the guitar 2. The operator normally will not be able to strum the strings of the guitar 2 with the hand used to control the throttle of the engine 11 although his or her other hand will normally be in contact with the strings at the neck 4 of the guitar 2 and that hand will be able to strum, pick, or quaver the strings. The operator may or may not choose to cause the strings of the guitar 2 to emit sounds while accelerating the engine 11 and rotating the saw chain 13. That choice depends on the musical judgment of the operator and the effect she seeks to produce musically.

Other kinds of saws might be employed in this invention, such as a saber saw, although the means for attachment to the guitar preferably would be different because the saw blade reciprocates (the engine housing would be attached to the body guitar).

Other kinds of traditional musical instruments may be employed in this invention, such as a banjo.

The materials of the collar and the shields could be varied as well as the method of attachment of the saw to the guitar and the placement of spacers. Furthermore, the backside of the body of the guitar could contain an indentation for receiving the saw blade thereby obviating the need for a collar if the indentation was deep enough that the saw blade is recessed in the indentation below the backside of the guitar. In that case the shield could be attached directly to the backside of the guitar and the saw blade could be connected directly to a ridge formed in the body of the guitar within the indentation for the purpose of supporting the saw blade in the indentation above the body of the guitar to prevent the body of the guitar from contacting the saw chain.

While illustrative embodiments of the devices and methods disclosed herein have been shown and described in the above description, numerous variations and alternative embodiments will occur to those skilled in the art and it should be understood that, within the scope of the appended claims, the invention may be practiced otherwise than as specifically described. Such variations and alternative embodiments are contemplated, and can be made, without departing from the scope of the invention as defined in the appended claims.

| List of Reference Numbers Used in this Specification | |
|---|---|
| 1 | musical instrument |
| 2 | guitar |
| 3 | body of guitar |
| 4 | neck of guitar |
| 5 | control knob |
| 6 | back surface of body of guitar |
| 10 | chain saw |
| 11 | engine of chain saw |
| 12 | saw |
| 13 | saw chain |
| 14 | saw blade |
| 20 | bolt |
| 21 | nut |
| 22 | spacer |
| 25 | collar |
| 25a | opening in collar 25 |
| 26 | back shield |
| 27 | screw |
| 28 | bolt |
| 29 | nut |
| 30 | front and sides shield |
| 31 | base of shield 30 |
| 32 | end wall of shield 30 |
| 34 | flange |
| 32 | end wall of shield 30 |
| 36 | screw |

What is claimed is:

1. A musical instrument comprising a guitar joined to a motorized saw, wherein the motorized saw is a chain saw comprising an engine and a saw, the saw comprising a saw blade that supports a saw chain and the engine is arranged to drive the saw chain around the saw blade, the guitar comprises a body having a front side upon which are mounted strings and a back side, and the saw blade is attached to the back side of the body of the guitar and spaced from the back side of the body of the guitar whereby the saw chain does not contact the back side of the body of the guitar.

2. The musical instrument according to claim 1 wherein the saw blade is attached to the body of the guitar by at least one bolt.

3. The musical instrument according to claim 2 wherein at least one spacer is mounted between the saw blade and the backside of the body of the guitar.

4. The musical instrument according to claim 3 wherein the spacer is mounted on the bolt between the backside of the body of the guitar and the saw blade.

5. The musical instrument according to claim 2 wherein a plurality of bolts is provided to attach the saw blade to the backside of the body of the guitar.

6. The musical instrument according to claim 1 further comprising a shield connected to the back side of the body of the guitar over and spaced from the saw blade whereby the shield protects the operator of the musical instrument from contact with the saw chain.

7. The musical instrument according to claim 6 further comprising a collar attached to the back side of the body of the guitar, the collar surrounding the saw blade and projecting away from the back side of the body of the guitar, and the shield is attached to the collar over and spaced from the saw chain.

8. The musical instrument according to claim 6 wherein the shield is made of a transparent substance.

9. The musical instrument according to claim 7 wherein the shield is a sheet made of a transparent substance.

10. The musical instrument according to claim 1 wherein the guitar and the saw are spaced from each other and further comprising:
  a back shield connected to the back side of the body of the guitar over and spaced from the saw chain,
  and a front and sides shield connected to the saw and the guitar between the saw and the guitar and spaced from the saw chain,
  whereby the back shield and the front and sides shield protects the operator of the musical instrument from contact with the saw chain.

11. The musical instrument according to claim 10 wherein one or both of the shields are made of a transparent substance.

12. A method of making a musical instrument comprising:
  providing a chain saw comprising an engine and a saw, the saw comprising a saw blade that supports a saw chain and the engine is arranged to drive the saw chain around the saw blade,
  providing a guitar comprising a body having a front side upon which are mounted strings and a back side,
  connecting the saw blade to the back side of the body of the guitar and spaced from the back side of the body of the guitar whereby the saw chain does not contact the back side of the body of the guitar, and
  connecting a shield to the back side of the body of the guitar over and spaced from the saw chain whereby the shield protects the operator of the musical instrument from contact with the saw chain.

13. The method of making a musical instrument according to claim 12 wherein the step of connecting the saw blade to the body of the guitar comprises insertion of a plurality of bolts through the saw blade into the body of the guitar.

14. The method of making a musical instrument according to claim 13 further comprising mounting one or more spacers on the bolt between the backside of the body of the guitar and the saw blade in order to separate the backside of the body of the guitar and the saw blade whereby the saw chain will not come into contact with the back side of the body of the guitar.

15. The method of making a musical instrument according to claim 12 further comprising:
  attaching a collar to the back side of the body of the guitar, the collar surrounding the saw blade and projecting away from the back side of the body of the guitar, and wherein the shield is attached to the collar over and spaced from the saw chain.

16. The method of making a musical instrument according to claim 12 wherein the shield is made of a transparent substance.

17. The method of making a musical instrument according to claim 12 wherein the guitar and the engine of the saw are spaced from each other and further comprising:
  connecting a shield to and between the engine of the saw and the guitar whereby the shield connected to the backside of the guitar and the shield between the engine of the saw and the guitar together protect the operator of the musical instrument from contact with the saw chain.

18. The method of making a musical instrument according to claim 17 wherein the shield between the engine of the saw and the guitar is made of a transparent substance.

19. A method of playing a musical instrument, comprising:
  providing a musical instrument comprising
    a chain saw comprising an engine and a saw, the saw comprising a saw blade that supports a saw chain and the engine is arranged to drive the saw chain around the saw blade,
    a guitar comprising a body having a front side upon which are mounted strings and a back side, wherein the saw blade is attached to the back side of the body of the guitar and spaced from the back side of the body of the guitar whereby the saw chain does not contact the back side of the body of the guitar, and
    one or more shields connected to the body of the guitar over the saw blade whereby the one or more shields protects the operator of the musical instrument from contact with the saw chain;
  playing the guitar to produce music, by strumming the strings of the guitar;
  starting the engine of the chain saw; and
  accelerating the engine of the chain saw in order to revolve the saw chain around the saw blade, whereby the sound of an accelerated chain saw is added to the music of the guitar.

* * * * *